United States Patent
Synder, Jr. et al.

(10) Patent No.: US 7,541,813 B2
(45) Date of Patent: Jun. 2, 2009

(54) EXTERNALLY GUIDED AND DIRECTED HALBACH ARRAY FIELD INDUCTION RESISTIVITY TOOL

(76) Inventors: Harold L. Synder, Jr., 2185 S. Larsen Pkwy., Provo, UT (US) 84606; Paula Turner, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 11/776,484

(22) Filed: Jul. 11, 2007

(65) Prior Publication Data

US 2008/0265894 A1 Oct. 30, 2008

Related U.S. Application Data

(63) Continuation-in-part of application No. 11/776,447, filed on Jul. 11, 2007.

(60) Provisional application No. 60/914,619, filed on Apr. 27, 2007.

(51) Int. Cl.
*G01V 3/10* (2006.01)
*G01V 3/18* (2006.01)

(52) U.S. Cl. .................... 324/339; 324/343; 324/333

(58) Field of Classification Search ............... 324/343, 324/339, 323, 322, 333, 334, 338, 344, 345, 324/342, 346, 349, 354, 355, 357, 363, 366, 324/367, 228, 229; 336/84 R; 175/50
See application file for complete search history.

(56) References Cited

U.S. PATENT DOCUMENTS

| | | | |
|---|---|---|---|
| 4,785,247 A | 11/1988 | Meador |
| 4,933,640 A | 6/1990 | Kuckes |
| 4,980,643 A | 12/1990 | Gianzero |
| 5,045,795 A | 9/1991 | Gianzero |
| 5,081,419 A | 1/1992 | Meador |
| 5,089,779 A | 2/1992 | Rorden |
| 5,095,272 A | 3/1992 | Sinclair |
| 5,428,293 A | 6/1995 | Sinclair |
| 5,442,294 A | 8/1995 | Rorden |
| 5,448,227 A | 9/1995 | Orban |
| 5,594,343 A | 1/1997 | Clark |
| 5,606,260 A | 2/1997 | Giordano |
| 6,068,394 A | 5/2000 | Dublin |
| 6,100,696 A | 8/2000 | Sinclair |
| 6,163,155 A | 12/2000 | Bittar |
| 6,191,586 B1 | 2/2001 | Bittar |
| 6,218,842 B1 | 4/2001 | Bittar |
| 6,359,438 B1 | 3/2002 | Bittar |
| 6,476,609 B1 | 11/2002 | Bittar |

(Continued)

*Primary Examiner*—Reena Aurora
(74) *Attorney, Agent, or Firm*—Tyson J. Wilde; Jad A. Mills (57) ABSTRACT

In one aspect of the invention an induction resistivity tool incorporated into a downhole tool string comprises an outer wall of a downhole component having an outer diameter. At least one induction transmitter assembly is disposed along the outer diameter. The transmitter assembly comprises at least one coil array and at least one induction transmitter coil wound about at least one core. The coil array comprises a plurality of magnetic units and each unit comprising a magnetic field orientation. The magnetic field orientations accumulatively form a Halbach array with an augmented field side and a canceled field side of the array. The transmitter assembly generates an induction signal from outside the outer wall and substantially prevents the signal from entering the outer wall when the transmitter assembly is carrying an electrical current.

17 Claims, 9 Drawing Sheets

U.S. PATENT DOCUMENTS

| | | |
|---|---|---|
| 6,538,447 B2 | 3/2003 | Bittar |
| 6,577,129 B1 | 6/2003 | Thompson |
| 6,586,939 B1 | 7/2003 | Fanini |
| 6,667,620 B2 | 12/2003 | Homan |
| 6,677,756 B2 | 1/2004 | Fanini |
| 6,680,613 B2 | 1/2004 | Rosthal |
| 6,768,407 B2 | 7/2004 | Kohda |
| 7,046,009 B2 | 5/2006 | Itskovich |
| 7,098,657 B2 | 8/2006 | Guilhamat |
| 7,098,858 B2 | 8/2006 | Bittar |
| 7,138,897 B2 | 11/2006 | Minerbo |
| 7,141,981 B2 | 11/2006 | Folberth |
| 7,150,316 B2 | 12/2006 | Itskovich |
| 7,193,420 B2 | 3/2007 | Chen |
| 7,212,132 B2 | 5/2007 | Gao |
| 2004/0104794 A1 | 6/2004 | Kohda |

EXTERNALLY GUIDED AND DIRECTED HALBACH ARRAY FIELD INDUCTION RESISTIVITY TOOL

CROSS REFERENCE TO RELATED APPLICATIONS

This application is a continuation-in-part of U.S. patent application Ser. No. 11/776,447 filed on Jul. 11, 2007 and entitled Externally Guided and Directed Field Induction Resistivity Tool. U.S. patent application Ser. No. 11/776,447 is a continuation-in-part of Provisional U.S. Patent Application No. 60/914,619 filed on Apr. 27, 2007 and entitled Resistivity Tool. All of the above mentioned references are herein incorporated by reference for all that they contain.

BACKGROUND OF THE INVENTION

For the past several decades, engineers have worked to develop apparatus and methods to effectively obtain information about downhole formations, especially during the process of drilling and following this process using wireline methods or pushed tool methods for use in horizontal wells. All of these methods are collectively referred to in the industry as logging. During the drilling process and, with time afterward, drilling fluids begin to flush and intermingle with the natural fluids in the formation forming an invasion zone near the drilled borehole. This fluid exchange increases with time and the formation wall can degrade or become damaged with further drilling operations which can mask or alter information about the formation that is of interest. Logging-while-drilling (LWD refers to a set of processes commonly used by the industry to obtain information about a formation near the drill bit during the drilling process in order to transmit the information from components located downhole on oil and gas drilling strings to the ground's surface. Measurement-while-drilling (MWD) refers to a method of LWD that will store part and transmit the remaining information to the surface or store all of the information collected during drilling for later retrieval and download into surface electronics. LWD methods are also used in smart drilling systems to aid or direct the drilling operations and in some cases to maintain the drill in a specific zone of interest. The terms MWD and LWD are often used interchangeably in the industry and LWD will be used here to refer to both methods with the understanding that the LWD encompasses systems that collect formation, angular rotation rate and depth information and store this information for later retrieval and/or transmission of this information to the surface while drilling.

A common sensor used in logging systems is for the measurement of resistivity or the complement conductivity. The resistivity of the formation is quite often measured at different depths into the formation to determine the amount of fluid invasion and aid in the calculation of true formation resistivity. The formation resistivity is generally used with other sensors in an analysis to determine many other formation parameters. There are various types of resistivity sensors including direct current (DC), and alternating current (AC) focused resistivity which utilizes one or more electrodes devices, AC scanned resistivity which measures in a specific circumferential or angular pattern around the borehole and a fourth type called induction or propagation resistivity which also utilizes AC methods. Induction resistivity sensors generally use lower frequencies below 100 KHz while propagation sensors use higher frequencies. The terms induction sensor or induction tool will be used interchangeably here and will refer to both induction and propagation resistivity methods.

Induction tools with varying number and combinations of transmitter(s) and receiver(s) with varying separation distances and operating frequencies have been used to explore formations at various depths of investigation.

The prior art comprises the following references to resistivity tools and resistivity logging which have a common design problem that either allows the transmitted field to penetrate the induction tool or if a shield is utilized, do not actively direct the field away from electrical and magnetic tool surfaces and materials.

U.S. Pat. No. 6,677,756 to Fanini, et al, which is herein incorporated by reference for all that it contains, discloses an induction tool for formation resistivity evaluations. The tool provides electromagnetic transmitters and sensors suitable for transmitting and receiving magnetic fields in radial directions.

U.S. Pat. No. 6,359,438 to Bittar, which is herein incorporated by reference for all that it contains, discloses a resistivity tool for use in an LWD system that includes a transmitter array with multiple transmitters positioned above a pair of receivers. The transmitters are selectively energized, causing current to be induced in the collar of the tool.

U.S. Pat. No. 6,577,129 to Thompson, et al, which is herein incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is herein incorporated by reference for all that it contains, discloses a multi-mode resistivity tool for use in a logging-while-drilling system that includes an asymmetric transmitter design with multiple transmitters capable of generating electromagnetic signals at multiple depths of investigation.

U.S. Pat. No. 7,141,981 to Folbert, et al, which is herein incorporated by reference for all that it contains, discloses a resistivity logging tool suitable for downhole use that includes a transmitter, and two spaced apart receivers. The resistivities at the two receivers are corrected based on measuring the responses of the receivers to a calibration signal.

U.S. Pat. No. 6,218,842 to Bittar, et al, which is herein incorporated by reference for all that it contains, discloses a resistivity tool for use in LWD systems that includes an asymmetric transmitter design with multiple transmitters capable of generating EM signals at multiple frequencies.

U.S. Pat. No. 5,045,795 to Gianzero, et al, which is herein incorporated by reference for all that it contains, discloses a coil array which is installed on a MWD drill collar for use in a resistivity logging system. The drill collar is provided with upper and lower coil support rings. These are toroids which support individual coil segments, and are connected by suitable magnetic shorting bars. The coil segments and shorting bars inscribe a specified solid angle or azimuthal extent.

U.S. Pat. No. 5,606,260 to Giordano, et al, which is herein incorporated by reference for all that it contains, discloses a microdevice is provided for measuring the electromagnetic characteristics of a medium in a borehole. The microdevice includes at least one emitting or transmitting coil (31), and at least one receiving coil (41,51). The microdevice generates an A.C. voltage at the terminals of the transmitting coil and measures a signal at the terminals of the receiving coil. The microdevice also includes an E-shaped electrically insulating, soft magnetic material circuit serving as a support for each of the coils and which is positioned adjacent to the medium in the borehole.

U.S. Pat. No. 6,100,696 to Sinclair, which is herein incorporated by reference for all that it contains, discloses a directional induction logging tool is provided for measurement while drilling. This tool is preferably placed in a side pocket of a drill collar, and it comprises transmitter and receiver coils and an electromagnetic reflector.

U.S. Pat. No. 6,163,155 to Bittar, et al, which is herein incorporated by reference for all that it contains, discloses a downhole method and apparatus for simultaneously determining the horizontal resistivity, vertical resistivity, and relative dip angle for anisotropic earth formations.

U.S. Pat. No. 6,476,609 to Bittar, et al, which is herein incorporated by reference for all that it contains, discloses an antenna configuration in which a transmitter antenna and a receiver antenna are oriented in nonparallel planes such that the vertical resistivity and the relative dip angle are decoupled.

U.S. patent application Ser. No. 11/676,494 to Hall et al., which is herein incorporated by reference for all that it contains, discloses an induction resistivity tool comprising a flexible ring of magnetically conducting material disposed intermediate an induction coil and a surface of an annular recess.

U.S. patent application Ser. No. 11/687,891 to Hall et al., which is herein incorporated by reference for all that it contains, discloses a resistivity tool comprising an actuator in a downhole component that is adapted to put an electrically conductive element into and out of electrical contact with at least one electrically insulated induction coil and thereby change an optimal signal frequency of the at least one coil.

FIELD OF THE INVENTION

The present invention relates to a measurement procedure used to assess and aid in the recovery of petroleum, gas, geothermal and other minerals and resources. And more particularly, this invention relates to the field of induction resistivity tools for tool strings employed in such exploration. The present invention generally relates to a well logging tool with one or more transmitters and one or more receivers that measure the resistivity and other formation parameters adjacent to the wellbore. More particularly, the present invention relates to a method of generating, directing and shielding a field adjacent to and away from an electrically conductive structure with a minimum of interference from the electrical or magnetic properties of the structure that would alter, distort or minimize the generated field. The invention applies to MWD/LWD tools, pad on arm based tools and pushed tools for use in vertical to horizontal wellbores.

BRIEF SUMMARY OF THE INVENTION

The embodiment of the invention is a configuration of windings, coils, spirals or antenna that generates, and actively guides and directs a field in a path external to and away from an electrically conductive structure with some electrical and/or magnetic properties.

In a padded, pushed or LWD induction resistivity tool, the preferred embodiment of a single transmitter element is a modified, alternating current (AC) driven Halbach array formed from four or more windings, coils, spirals or antenna that generates an augmented field perpendicular to the long axis of the metal drill collar or mandrel such that the field can be guided and directed away from the collar or mandrel. The transmitter element may include one or more windings, coil, spiral or antenna, herein referred to as bucking coils, positioned in such a manner as to aid in directing the field away from the collar or mandrel. The transmitter element may utilize insulating, electrical, ferrite and/or magnetic materials to guide the field to minimize the influence of the metal collar or mandrel. A single or plurality of transmitter elements are placed either partially or completely circumferentially around the perimeter of the collar or mandrel at any angle to form a single transmitter. In padded embodiments, one or more transmitter elements may be utilized. Completely or partially circumferential or padded implementations of the transmitter element allow the system to preferentially measure only a small angular area of the formation for detailed analysis or smart tool or guided drilling applications.

In a padded, pushed or LWD induction resistivity tool, the preferred embodiment of a single receiver element is one or more winding, coil, spiral or antenna that detects the generated field with a minimum of interference from the collar or mandrel. The receiver element may utilize insulating, electrical, ferrite and/or magnetic materials to guide and direct the field to minimize the influence of the collar or mandrel A single or plurality of receiver elements are placed either partially or completely circumferentially around the perimeter of the collar or mandrel at any angle to form a single receiver. In padded embodiments, one or more receiver elements may be utilized and oriented at any angle. Circumferentially or padded implementations of the receiver element allow the system to preferentially measure only a small angular area of the formation for detailed analysis or smart tool or guided drilling applications.

Any number of transmitters and receivers can be used to obtain a given depth of investigation into the formation and a given vertical field or bed resolution.

The plurality of transmitter, receiver and bucking windings, coils, spirals or antenna may be electrically connected in parallel or in series. One or more of the plurality of transmitters may be adapted to switch between a series and parallel connection with another of the plurality of transmitters.

The induction transmitter assembly may be disposed within one or more radial recesses disposed in the outer diameter of the outer wall of the collar or mandrel. The recesses may be horizontal, perpendicular to the long axis of the collar or mandrel or at any angle.

The resistivity tool may be in communication with a downhole network. The resistivity tool may be incorporated into a bottom hole tool assembly. The at least one induction transmitter assembly may be tilted with respect to an axis of the downhole tool string.

DETAILED DESCRIPTION OF THE INVENTION AND THE PREFERRED EMBODIMENT

Figure 1:
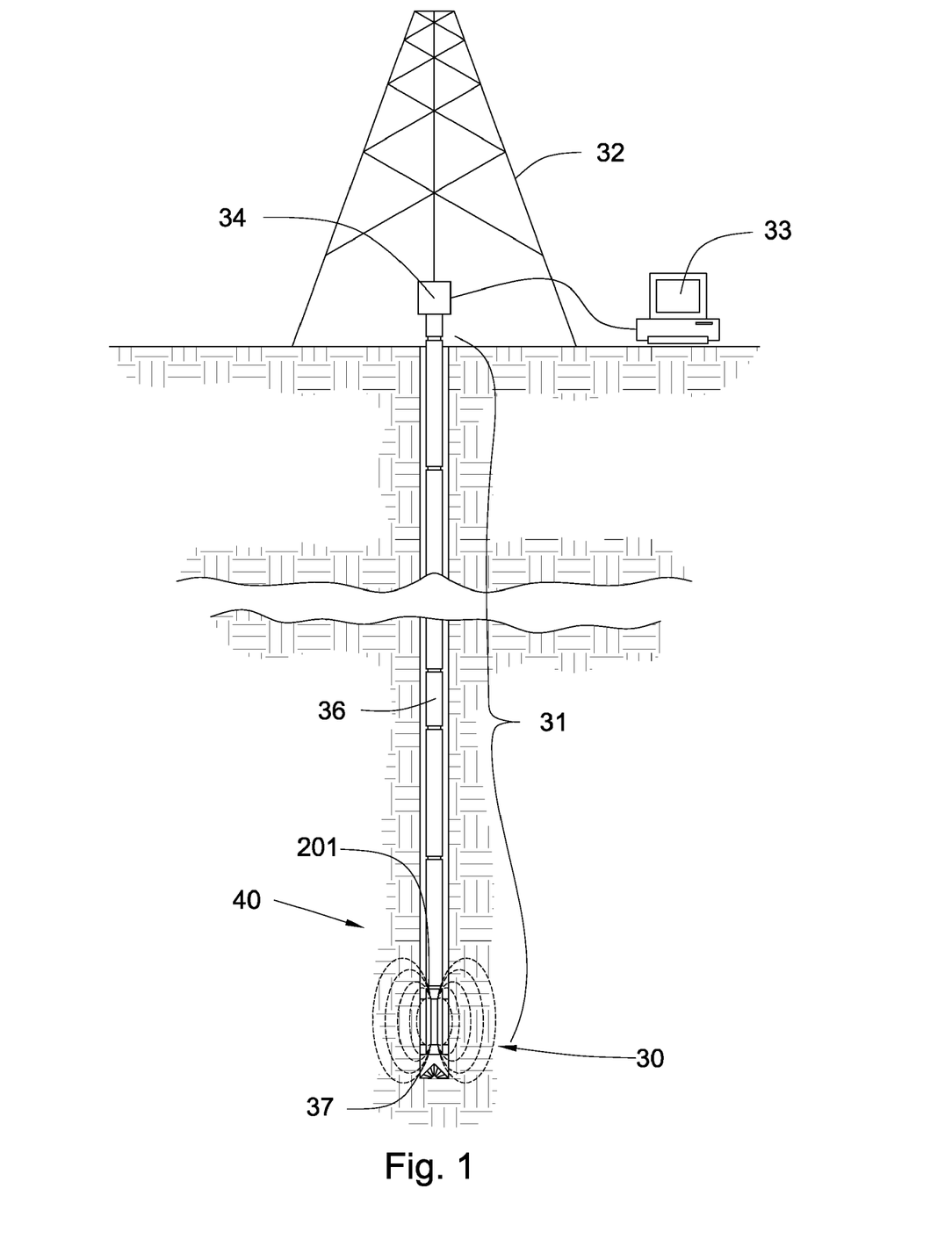
FIG. 1 is a cross-sectional diagram of an embodiment of a downhole tool string.

Referring now to FIG. 1, a downhole tool string 31 may be suspended by a derrick 32. The tool string may comprise one or more downhole components 36, linked together in a tool string 31 and in communication with surface equipment 33 through a downhole network. Having a network in the tool string 31 may enable high-speed communication between each device connected to it and facilitate the transmission and receipt of data between sensors, energy sources, and energy receivers. The tool string 31 is depicted in a vertical drilled hole but it may be at any angle including horizontal.

The tool string 31 or surface equipment 33 may comprise an energy source or multiple energy sources. The energy source may transmit electrical current to one or more downhole components 36 on the bottom hole assembly 37 or along the tool string 31. In some embodiments of the invention, one or more downhole component 36 may comprise sensors. These sensors may sense gamma rays, radioactive energy, resistivity, torque, pressure, or other drilling dynamics measurements or combinations thereof from the formation being drilled. Any combination of downhole components 36 in a tool string 31 may be compatible with the present invention.

Data may be transmitted along the tool string 31 through techniques known in the art. A preferred method of downhole data transmission using inductive couplers disposed in tool joints is disclosed in the U.S. Pat. No. 6,670,880 to Hall, et al, which is herein incorporated by reference for all it discloses. An alternate data transmission path may comprise direct electrical contacts in tool joints such as in the system disclosed in U.S. Pat. No. 6,688,396 to Floerke, et al., which is herein incorporated by reference for all that it discloses. Another data transmission system that may also be adapted for use with the present invention is disclosed in U.S. Pat. No. 6,641,434 to Boyle, et al., which is also herein incorporated by reference for all that it discloses. In some embodiments, of the present invention alternative forms of telemetry may be used to communicate with the downhole components 36, such as telemetry systems that communicate through the drilling mud or through the earth. Such telemetry systems may use electromagnetic or acoustic waves. The alternative forms of telemetry may be the primary telemetry system for communication with the tool string 31 or they may be back-up systems designed to maintain some communication if the primary telemetry system fails. A data swivel 34 or a wireless top-hole data connection may facilitate the transfer of data between components 36 of the rotatable tool string 31 and the stationary surface equipment, such as a control module 33.

Preferably the downhole tool string 31 is a drill string. In other embodiments the downhole tool string 31 is part of a coiled tubing logging system or part of a production well. In the present embodiment, an embodiment of a resistivity tool 201 in accordance with the present invention is shown producing a transmitter field 30 and projecting the transmitter field 30 through the formation 40.

Control equipment may be in communication with the downhole tool string components 36 through an electrically conductive medium. For example, a coaxial cable, wire, twisted pair of wires or combinations thereof may travel from the surface to at least one downhole tool string component. The medium may be in inductive or electrical communication with each other through couplers positioned so as to allow signal transmission across the connection of the downhole component and the tool string. The couplers may be disposed within recesses in either a primary or secondary shoulder of the connection or they may be disposed within inserts positioned within the bores of the drill bit assembly and the downhole tool string component. As the control equipment receives information indicating specific formation qualities, the control equipment may then change drilling parameters according to the data received to optimize drilling efficiency. Operation of the drill string 31 may include the ability to steer the direction of drilling based on the data either manually or automatically.

Figure 2:
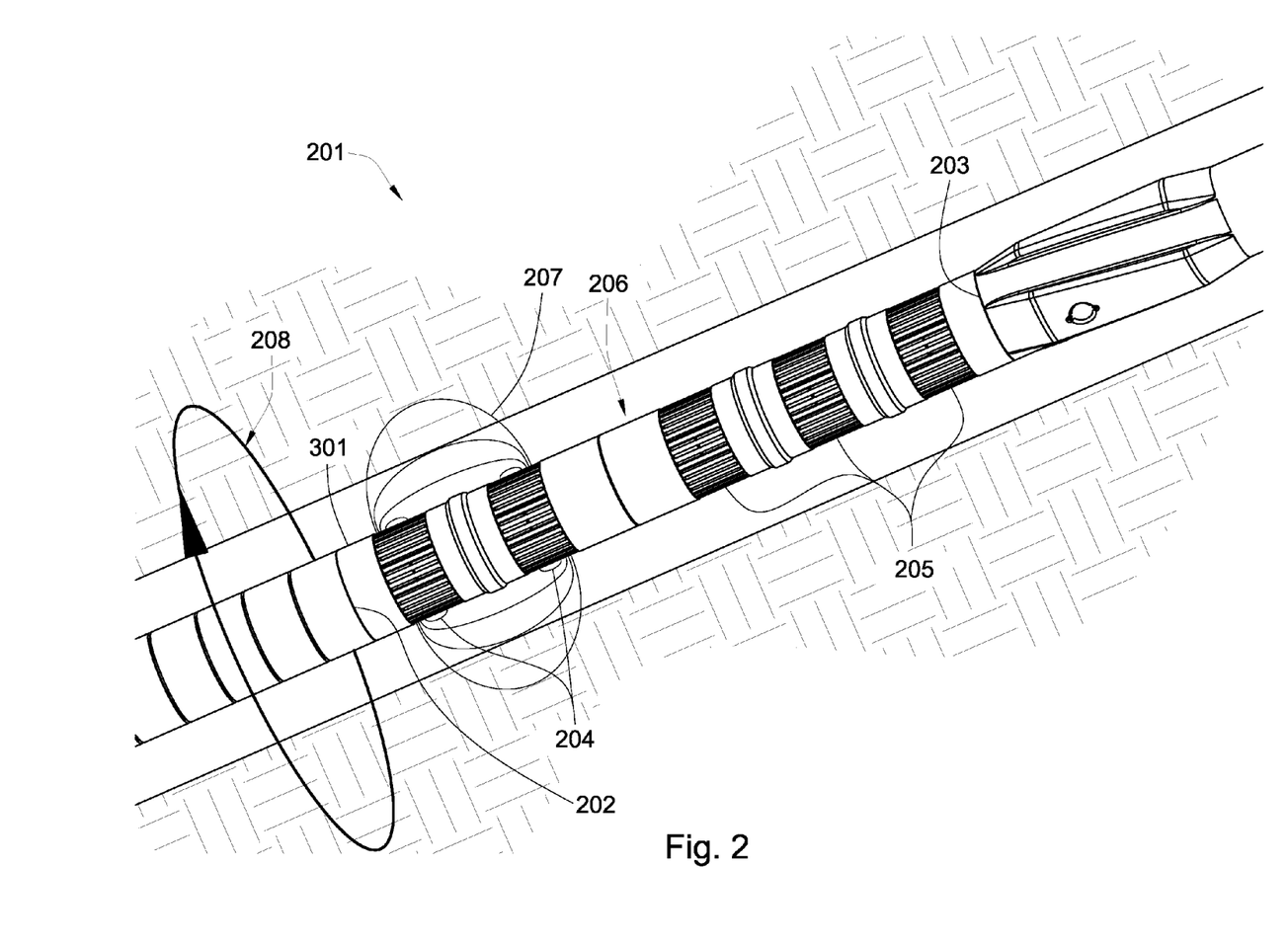
FIG. 2 is a perspective diagram of an embodiment of an inductive resistivity tool.

Referring now to FIG. 2 an embodiment of an inductive resistivity tool 201 is shown as part of a downhole tool string 31 which may be stationary or rotating. The resistivity tool 201 is shown intermediate first and second tool joints 202, 203. A transmitter field 207 is shown being produced by two transmitters 204, and being received by one of three receivers 205. The transmitter field 207 induces an electromagnetic field into the formation, which then in turn induces the receivers 205. By projecting the transmitter field through the formation and comparing the amplitude and phase of the received signal to that of the transmitted signal, the resistivity and other parameters of the formation may be determined. Because hydrocarbon and/or petroleum products in the formation are typically nonconductive, resistivity measurements may be used to determine the petroleum potential of a formation during the drilling process. The preferential projection of the transmitter field 207 away from the tool string 31 by the transmitter may allow the wall 301 of the downhole component 36 to comprise a magnetically and electrically conductive material. A single transmitter 204 or plurality of transmitters 204 may be disposed on a single tool 201. In embodiments comprising a plurality of transmitters 204, each transmitter 204 may be selectively energized. A sleeve 206 may be disposed around the components of the resistivity tool 201 to protect them from mud and/or debris. Although specific numbers of receivers 205 and transmitters 204 have been shown in the present embodiment, any combination of any number of receivers and transmitters 205, 204 may be consistent with the present invention. In some embodiments the tool 201 may be incorporated into a drilling string, a tool string, a pushed coil tubing string, a wireline system, a cable system, or combinations thereof.

Figure 3:
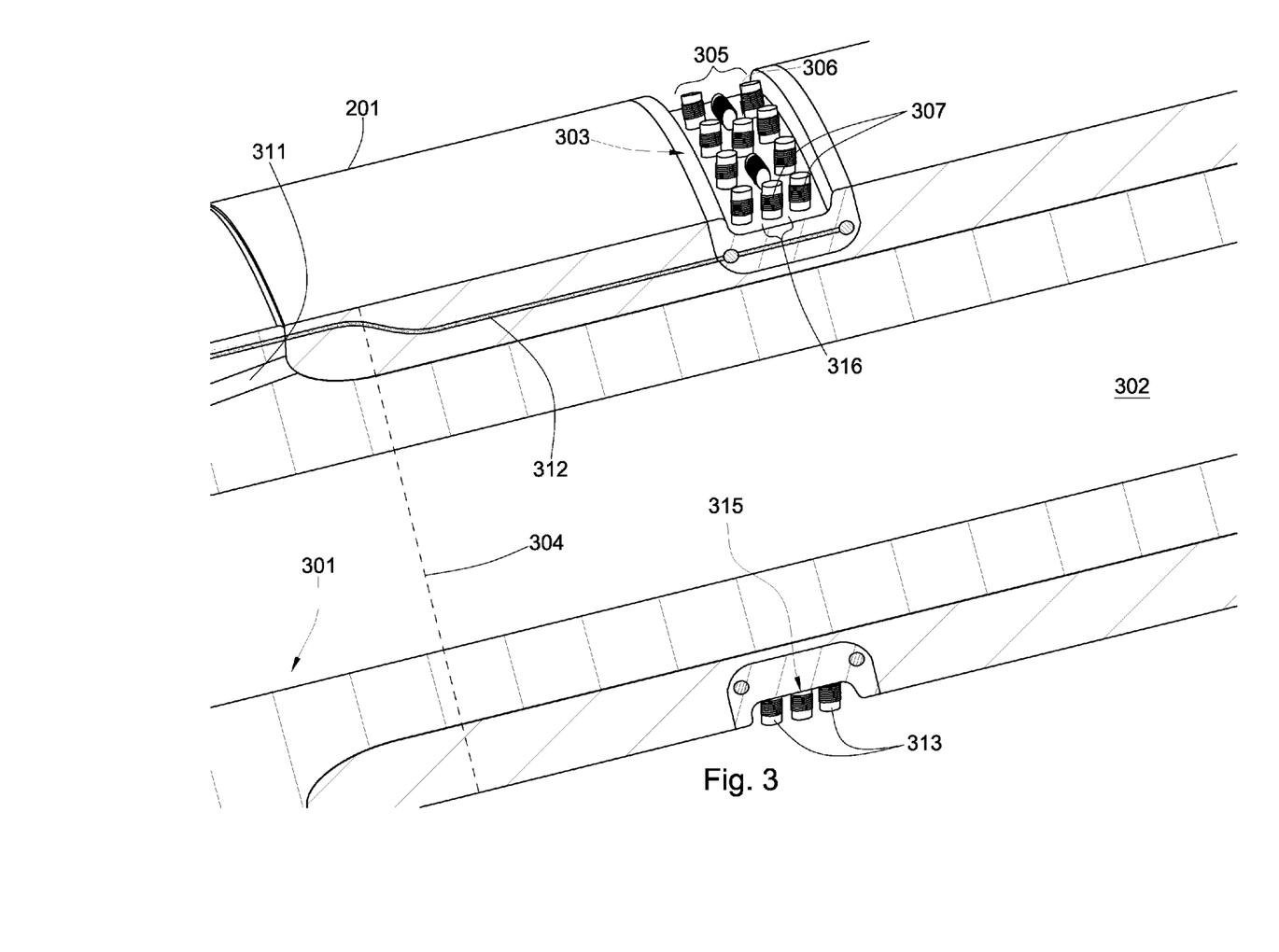
FIG. 3 is a cross-sectional diagram of an embodiment of an induction transmitter assembly in an inductive resistivity tool.

Referring now to FIG. 3, a cross sectional view of an embodiment of a portion of a resistivity tool 201 is shown without a protective sleeve 206 and disposed in a downhole component 36. The downhole component 36 has an outer wall 301 surrounding a central bore 302 through which drilling mud (not shown) may be transferred. The outer wall 301 comprises an annular radial recess 303 formed in its outer diameter 304. An induction transmitter assembly 305 is disposed within the radial recess 303. In this embodiment, the transmitter assembly 305 comprises a plurality of electromagnetic induction transmitter coils 306 which may also have adjacent directing bucking coils 313.

The transmitter coil 306 may be wound about at least one core 307. The transmitter coils 306 are arranged in an orientation to create an array 315. The array 315 may be a Halbach array 316 or a modified version of such an array. For the purposes herein, a modified Halbach array will also be referred to as a Halbach array. A Halbach array 316 creates an augmented field outward toward the formation 40 and away from the tool while simultaneously forming a canceled field between the coils and the tool 201.

The Halbach Array 316 may be modified with different coil widths and coil sizes in order to preferentially project a field in only one direction away from the tool. The Halbach Array 316 may also be modified with compound coils (not shown) in which one or more of the coils form a compound coil with two or more windings to preferentially project a field in only one direction away from the tool. The compound coils may be at any angle or orientation with each other. The transmitter assembly 305 may be mounted in any orientation and at any angle. It is further understood that the use of the term "coils" herein may be coils with individual windings or integral windings as part of the core 307, a spiral, or the coil may be an antenna. In embodiments of the invention where the coils 306 comprise individual or integral windings, a transmitter coil 306 may comprise between 1 and 1000 coil turns. Each core 307 may be comprised of a magnetically conductive material, such as ferrite. At least one core 307 may comprise an electrically insulating cylinder that is disposed around a dielectric material. The transmitter coils 306 may each comprise any number of coil turns, spirals or other electrical pattern. In some embodiments of the invention, the transmitter assembly 305 may comprise a single transmitter coil 306 that is wound about a plurality of cores 307.

When an electrical alternating current (AC) flows through the transmitter coil 306, an induction signal is transmitted and then directed away from the transmitter coil 306 by the action of the Halbach augmentation effect and may be aided by bucking coil(s) 313. The canceled field below the transmitter may allow for the use of a magnetically conductive material in the outer wall 301 without interfering with the action of the resistivity tool 201. Electrical current may be supplied to the transmitter assembly 305 via an electrically conductive medium 311. Electrically conductive medium 311 may comprise a plurality of copper wires 312, coaxial cable, twisted pairs of wire, or combinations thereof which may extend from electrically conductive medium 311 to locations throughout the transmitter assembly 305.

Figure 4:
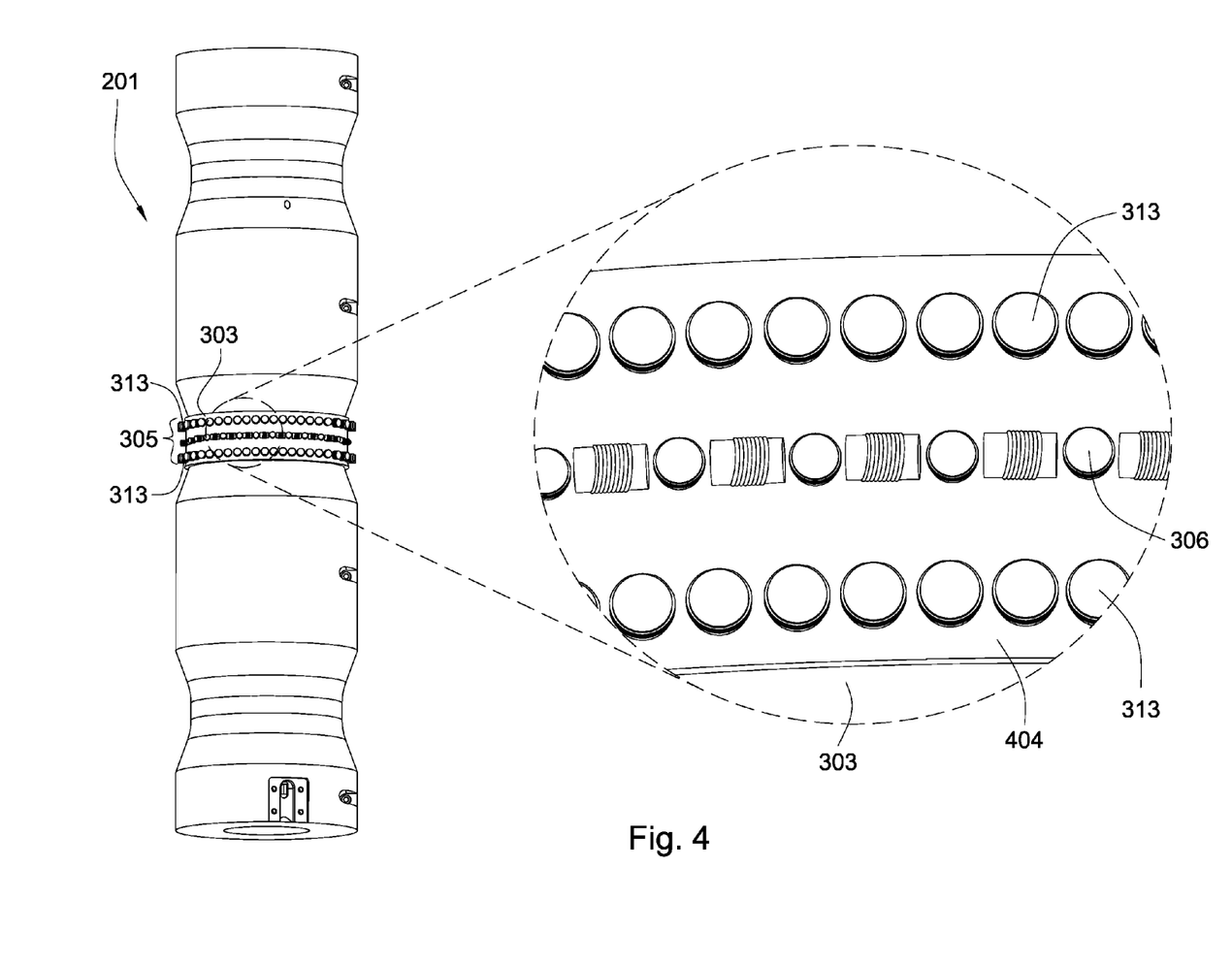
FIG. 4 is a perspective diagram of an embodiment of an induction transmitter assembly disposed in a radial recess with a detailed enlargement.

Referring now to FIG. 4, a perspective diagram of a resistivity tool 201 discloses an enlarged view of an embodiment of a transmitter assembly 305. The transmitter assembly 305 comprises a plurality of transmitter coils 306 arranged in a Halbach Array 316 and bucking coils 313 disposed along the outer diameter 304 and within a radial recess 303. In one embodiment the transmitter assembly 305 is circumferentially spans the outer diameter 304 of the tool 201. Each of the plurality of the transmitter coils 306 and bucking coils 313 may be wound about at least one core 307. The transmitter assembly 305 is separated from the bottom of annular radial recess by a shield 404 which may be an insulator and/or magnetically conductive material such as ferrite. The magnetically conductive electrically insulating material may comprise ferrite fibers, shavings, powder, crystals, or combinations thereof.

Figure 5:
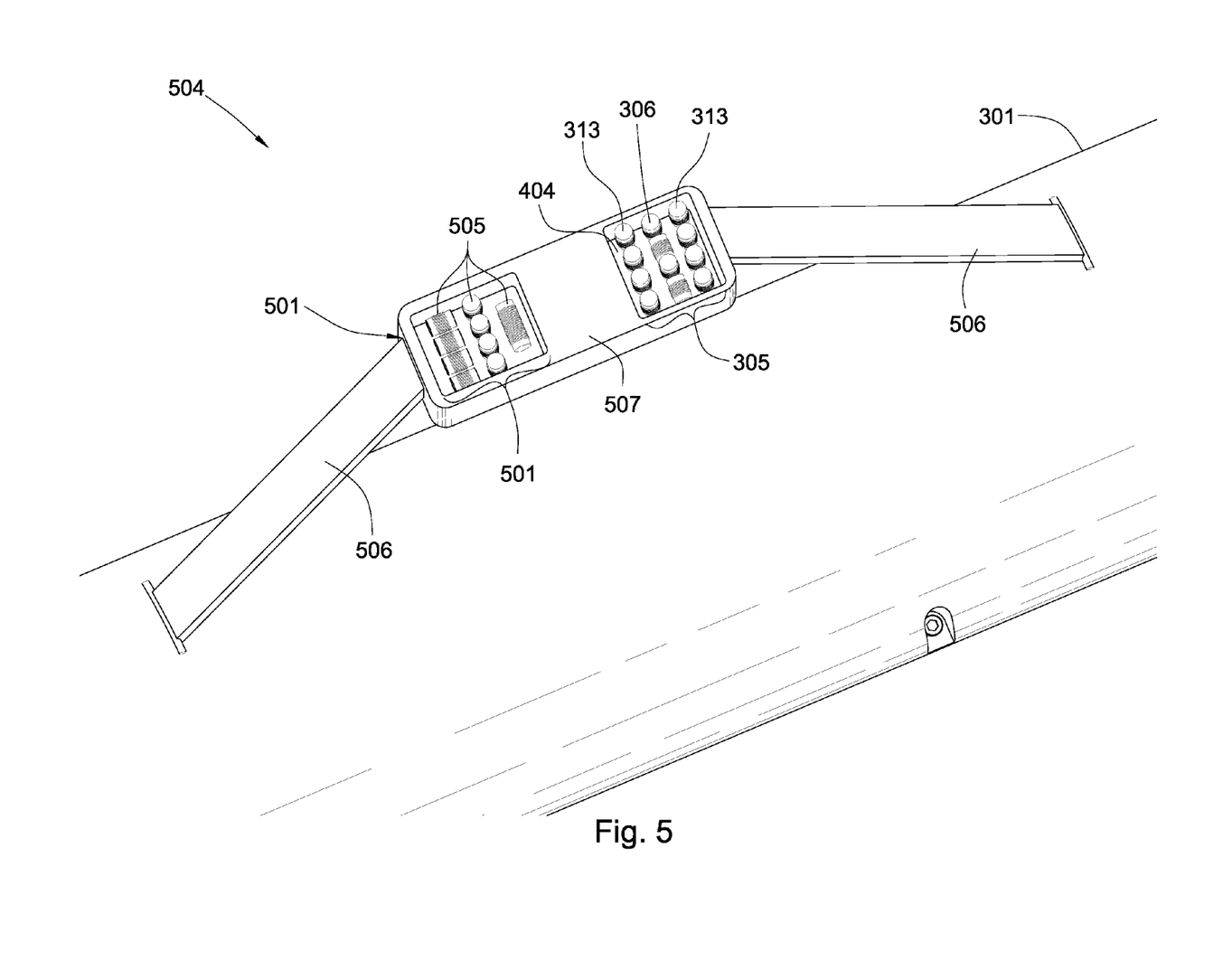
FIG. 5 is a perspective diagram of another embodiment of an induction transmitter assembly disposed on a padded arm on a downhole tool.

FIG. 5 discloses the invention embodied as a padded inductive resistivity tool 504. A transmitter assembly 305 and a receiver assembly 501 are each mounted on an outer extendable pad 507 connected to the outer wall 301 by an extendable arm assembly 506. The transmitter assembly 305 is adapted to direct transmitter field 207 away from the pad 507 and into a selected portion of the formation.40. The extendable arm assembly 506 may allow the transmitter assembly 305 to be disposed away from the outer wall 301 of tool 504 and proximate the formation 40. FIG. 5 also discloses a plurality of receiver coils 505 disposed on pad 507. Each receiver coil 505 is wound about at least one core 307. This embodiment makes further use of the Halbach augmented field side of the array by pointing it away from the pad 507, arm 506 and tool 504 such that these metal structures do not influence the generated field. Further the augmented side of the Halbach Array 316 directs the field 30 away from the pad 507 and into a selected portion of the formation.40 adjacent to the pad 507. The receiver assembly 501 is depicted with three different receiver coils 505 which are shown oriented in three orthogonal directions (x, y and z). The receiver assembly may only embody a single coil or a plurality of coils mounted in any direction. This embodiment would normally be used in pushed applications such as coiled tubing logging or in open hole wireline logging applications.

Figure 6:
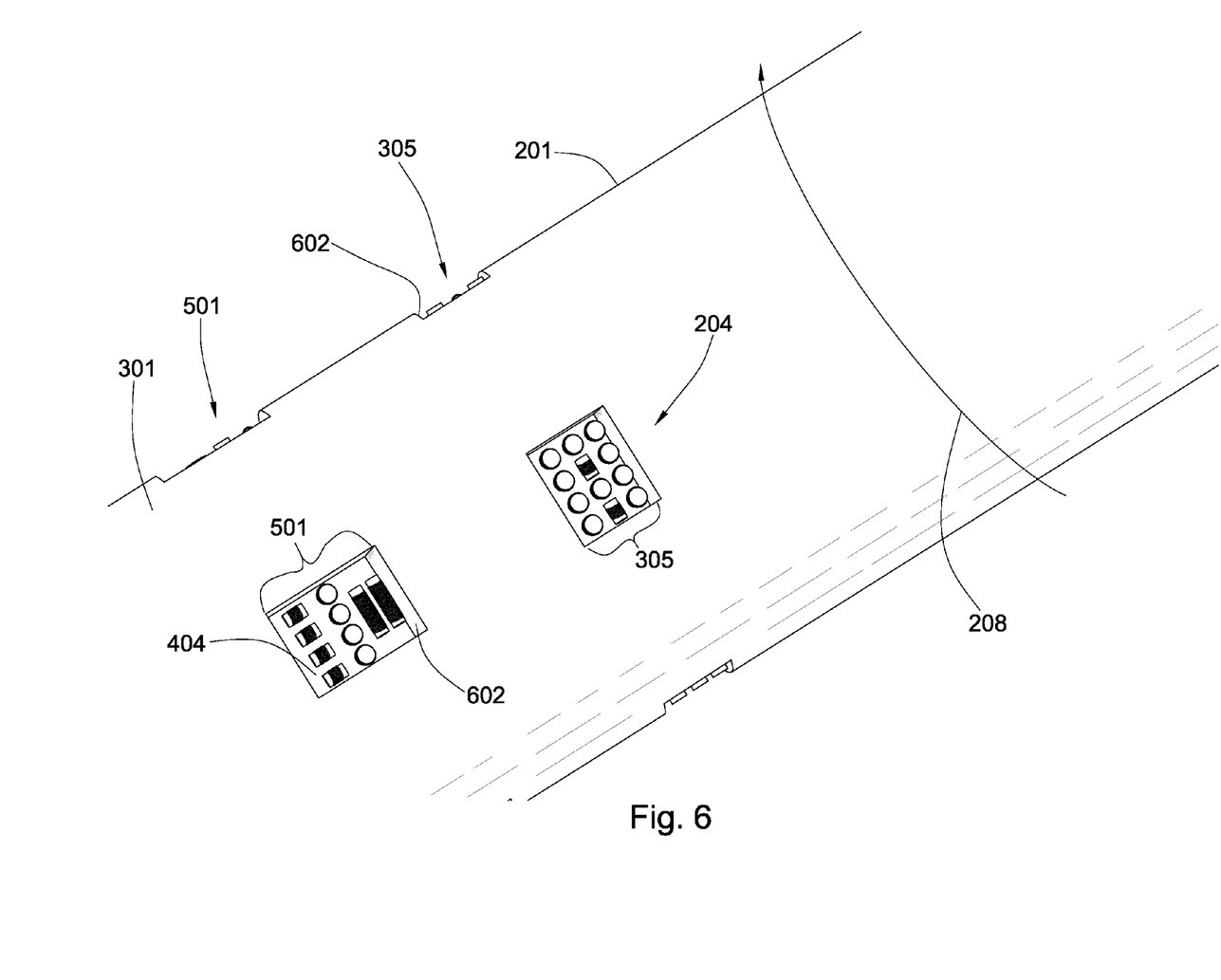
FIG. 6 is a perspective diagram of another embodiment of an induction transmitter assembly disposed in a radial recess used for angular radial investigation.

Referring now to FIG. 6, a plurality of transmitter and receivers assemblies 305, 501 may be mounted in small radial recesses 602 in the outer wall 301 of a resistivity tool. The transmitter and receiver assemblies 305, 501 may be disposed circumferentially around the outer diameter 304 of the tool 201. The specific location of each transmitter and receiver assembly 305, 501 may direct the field 30 into a selected portion of the formation 40. As the downhole components 36 and the induction resistivity tool 201 rotate axially as indicated by arrow 208, the directed field may sweep through a continuous path of selected portions of the formation 40. The induction resistivity tool 201 may consist of a single or plurality of Halbach transmitter assemblies 305 and receiver assemblies 501. The same measurement could be achieved with the embodiment depicted in FIGS. 3 and 4 or in FIG. 9 by selectively using sections of the transmitter 204 and receiver 205.

Open space in annular recesses 303, 602 around transmitter and receiver assemblies 305, 501 may be filled with a potting material and/or covered with a protective sleeve 206. The potting material may comprise a material selected from the group consisting of polymers, organic materials, thermoset polymers, vinyl, an aerogel composite, a synthetic binder, thermoplastic polymers, an epoxy, natural rubber, fiberglass, carbon fiber composite, polyurethane, silicon, a fluorinated polymer, grease, polytetrafluoroethylene, a perfluroroalkoxy compound, resin, soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, and combinations thereof Formations 40 may comprise varying resistivity characteristics depending on their composition. These characteristics may require the use of different voltages or frequencies to obtain logging information. Changes in voltage or frequency may be facilitated by the ability to change adjacent coils 306 between parallel and series connections. In some embodiments of the invention a signal alteration component (not shown) such as a voltage controlled oscillator (VCO) may be disposed between a power source and the transmitter assembly 305.

Figure 7:
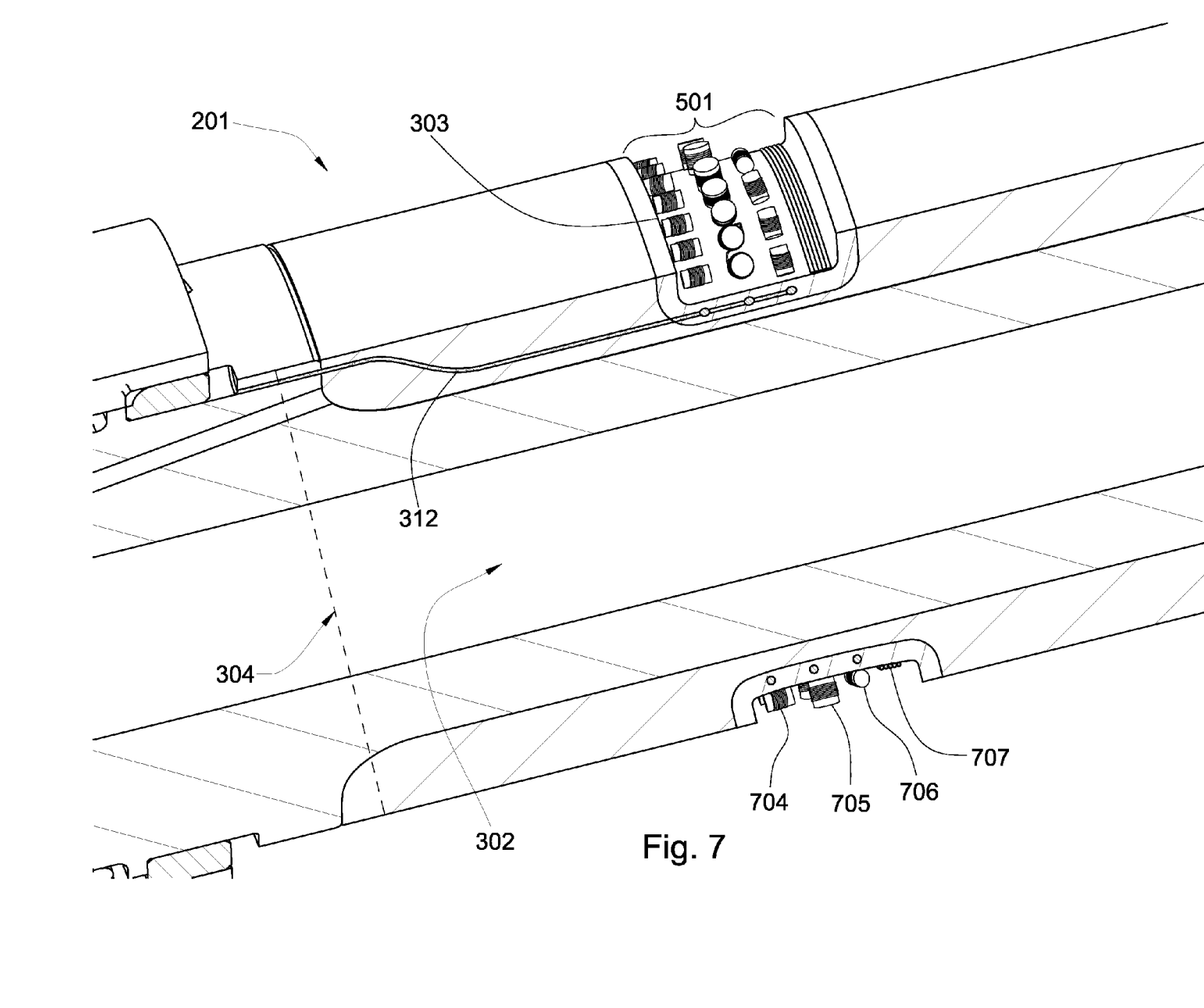
FIG. 7 is a cross-sectional diagram of an embodiment of an induction receiver assembly disposed in a radial recess.

FIG. 7 is a cross-sectional view of the induction tool 201 depicting another embodiment of a receiver assembly 501. The receiver assembly 501 may comprise longitudinal receiver coils 704, vertical receiver coils 705, horizontal receiver coils 706, circumferentially wrapped receiver coils, or combinations thereof.

Figure 8:
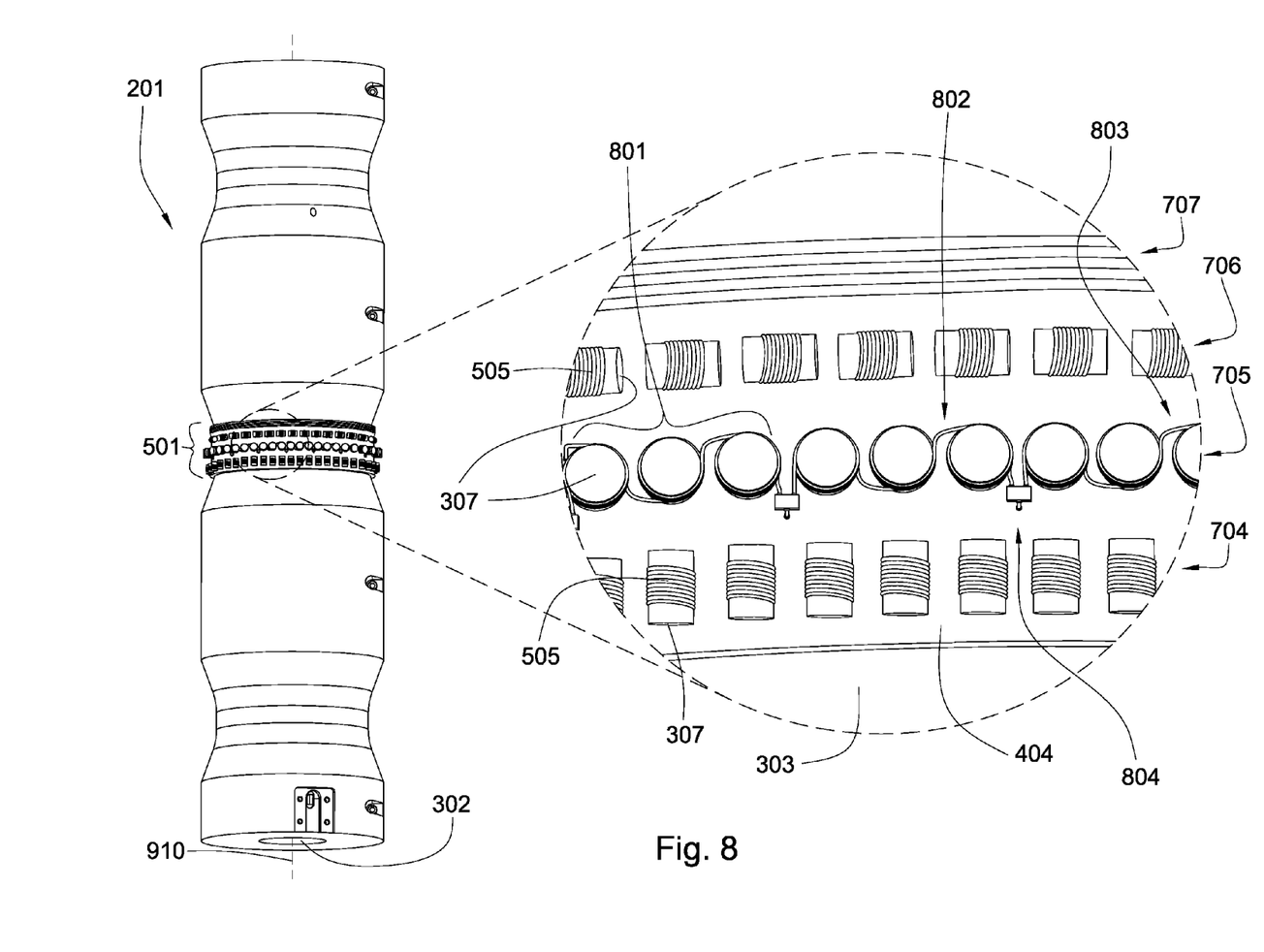
FIG. 8 is a perspective diagram of an embodiment of an induction receiver assembly disposed in a radial recesses with a detailed enlargement.

Referring now to FIG. 8, a perspective diagram of a resistivity tool 201 discloses an enlarged view of an embodiment of a receiver assembly 501 in which a receiver induction coil 505 is wound about a plurality of cores 307. A shield 404 is disposed intermediate the receiver assembly 501 and a outer surface of the outer wall 301 disposed in the annular recess 303. The shield 404 may be comprised of an insulator and/or ferrite material. The coils 505 may have a core 307 comprising air, ferrite or another material.

Each of the induction coils 306, 505 may be electrically parallel to one another. In some embodiments of the invention some of the induction coils 306, 505 may be electrically connected in series. Parallel connections of induction coils 306, 505 may be advantageous in embodiments where an inductance of the induction coil 306, 505 would otherwise be so great that it would require a prohibitive amount of voltage or amperage to induce a transmitter field 207 of the desired strength. In some embodiments, a plurality of the cores 307 may be wired together forming an induction segment 801. These segments 801 may be selectively turned on and off to aid in taking complex measurements. As disclosed in FIG. 8, a first induction coil 802 may be adapted to switch between a series and parallel connection with a second induction coil 803. This adaptation may be accomplished by connecting the first and second coils 802, 803 via a connector switch 804.

Figure 9:
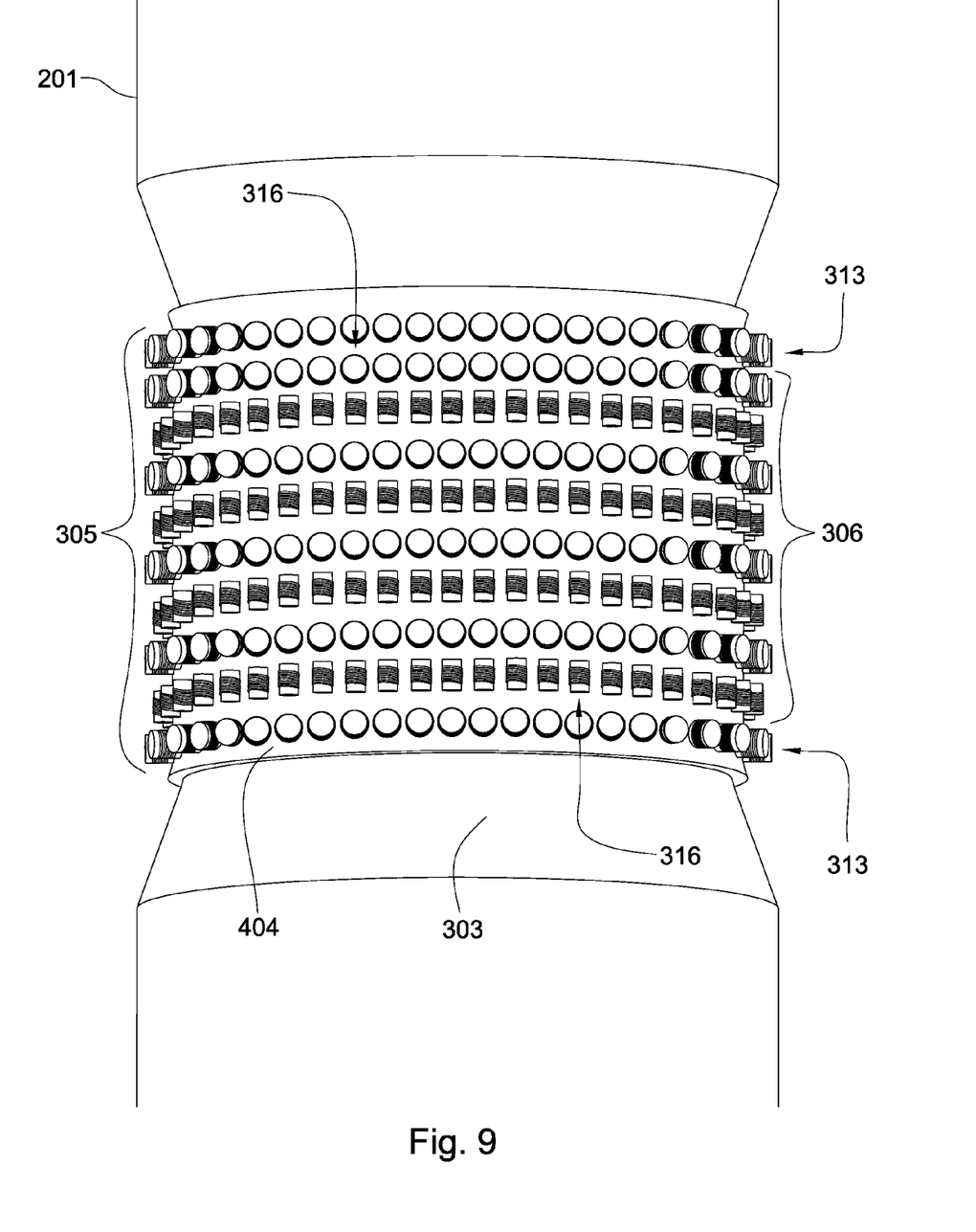
FIG. 9 is a perspective diagram of another embodiment of the induction transmitter assembly disposed in a radial recess.

FIG. 9 discloses an embodiment of the invention in which a plurality of Halbach Arrays 316 is mounted in a radial recess 303. Each of the plurality of Halbach Arrays 316 is disposed parallel to the long central axis of the tool's central bore 302. This embodiment may have a single or plurality of transmitter assemblies 305 mounted circumferentially around the tool 201. This embodiment may use the same or different size and shape coils and may also make use of compound coils to form preferential field orientations around the tool perimeter or along a long central axis 910 of the tool 201 while directing the augmented side of the generated field out and away from the tool 201. This embodiment may also use a shield 404.

Whereas the present invention has been described in particular relation to the drawings attached hereto, it should be understood that other and further modifications apart from those shown or suggested herein, may be made within the scope and spirit of the present invention.

What is claimed is:

1. An induction resistivity tool incorporated into a downhole tool string, comprising:
   an outer wall of a downhole component comprising an outer diameter;
   at least one induction transmitter assembly disposed along the outer diameter;
   the at least one transmitter assembly comprising at least one coil array and at least one induction transmitter coil wound about at least one core;
   a magnetic field orientations accumulatively formed by the coil array have an augmented field side and a canceled field side of the array;
   wherein the transmitter assembly generates an induction signal from outside the outer wall and substantially prevents the signal from entering the outer wall when the transmitter assembly is carrying an electrical current.

2. The tool of claim 1, wherein the at least one coil array is a transmitter.

3. The tool of claim 1, wherein the at least one coil array is a Halbach Array.

4. The tool of claim 1, wherein the at least one coil array generates an induction signal and directs the signal away from the outer wall.

5. The tool of claim 1, wherein at least one of the coil array comprises at least one coil wound about at least one magnetic core.

6. The tool of claim 1, wherein the induction transmitter assembly comprises a plurality of induction coils and each of the plurality of induction coils is wound about at least one magnetic core.

7. The tool of claim 1, wherein the induction transmitter assembly is disposed within one or more radial recesses disposed in the outer diameter of the outer wall.

8. The tool of claim 1, wherein the resistivity tool is in communication with a downhole network.

9. The tool of claim 1, wherein the resistivity tool is incorporated into a bottom hole assembly.

10. The tool of claim 1, wherein the outer wall of the downhole component comprises a magnetically conductive material.

11. The tool of claim 1, wherein the at least one core comprises a magnetically conductive material, a hollow dielectric-filled core, or combinations thereof.

12. The tool of claim 1, wherein a shield of magnetically conductive and electrically insulating material is disposed intermediate the at least one induction transmitter coil and the outer wall.

13. The tool of claim 12, wherein the magnetically conductive and electrically insulating material comprises ferrite fibers, shavings, powder, crystals, or combinations thereof.

14. The tool of claim 1, wherein the transmitter coil comprises between 1 and 1000 coil turns.

15. The tool of claim 1, wherein the tool is incorporated into a downhole tool string which is selected from the group consisting of part of a drilling tool string, pushed coil tubing string, a wireline and cable system.

16. The tool of claim 1, wherein the coil array is modified with compound coils, in which one or more of the coils are composed of two or more windings that are oriented at any angle with respect to the other.

17. The tool of claim 1, wherein the at least one induction transmitter assembly is tilted with respect to an axis of the downhole tool string.

* * * * *

UNITED STATES PATENT AND TRADEMARK OFFICE
CERTIFICATE OF CORRECTION

| | | |
|---|---|---|
| PATENT NO. | : 7,541,813 B2 | Page 1 of 1 |
| APPLICATION NO. | : 11/776484 | |
| DATED | : June 2, 2009 | |
| INVENTOR(S) | : Harold L. Snyder, Jr. and Paula Turner | |

It is certified that error appears in the above-identified patent and that said Letters Patent is hereby corrected as shown below:

On the Title Page Item (76)

The first named inventor listed at the top of the page and included in the inventors section: delete the word "Synder" and replace with the word --Snyder--.

Signed and Sealed this
Twenty-first Day of June, 2011

David J. Kappos
*Director of the United States Patent and Trademark Office*